(12) United States Patent
Stieglitz

(10) Patent No.: US 10,894,297 B2
(45) Date of Patent: Jan. 19, 2021

(54) WELDING GUN STABILIZER

(71) Applicant: Ezra Stieglitz, Fort Collins, CO (US)

(72) Inventor: Ezra Stieglitz, Fort Collins, CO (US)

( * ) Notice: Subject to any disclaimer, the term of this patent is extended or adjusted under 35 U.S.C. 154(b) by 173 days.

(21) Appl. No.: 15/865,587

(22) Filed: Jan. 9, 2018

(65) Prior Publication Data

US 2019/0210139 A1 Jul. 11, 2019

(51) Int. Cl.
*B23K 9/29* (2006.01)
*B23K 9/32* (2006.01)
*A41D 19/00* (2006.01)
*F16P 1/06* (2006.01)
*B23K 37/02* (2006.01)

(52) U.S. Cl.
CPC .......... *B23K 9/295* (2013.01); *A41D 19/0037* (2013.01); *B23K 9/321* (2013.01); *B23K 37/0205* (2013.01); *F16P 1/06* (2013.01); *A41D 2600/202* (2013.01)

(58) Field of Classification Search
CPC .......... B23K 9/295; B23K 9/287; B23K 9/32; B23K 9/321; B23K 37/0205; B23K 5/24; B23K 7/10; F16P 1/06; A41D 19/0037; A41D 2600/202
USPC .................. 219/137.51, 137.31; 248/651
See application file for complete search history.

(56) References Cited

U.S. PATENT DOCUMENTS

| | | | | |
|---|---|---|---|---|
| 2,394,136 A * | 2/1946 | Bakke | ............... | A41D 19/01529 2/16 |
| 2,438,792 A * | 3/1948 | Sandrik | ................... | B23K 9/32 2/17 |
| 2,445,863 A * | 7/1948 | Sarazin | ................... | B23K 37/02 219/137.51 |
| 4,161,643 A * | 7/1979 | Martin, Jr. | ............... | B23K 9/32 219/138 |
| 5,210,878 A * | 5/1993 | Triche | .................... | A41D 13/08 2/125 |
| 5,854,461 A * | 12/1998 | Sorenson | ............. | B23K 37/006 219/136 |
| 6,213,375 B1 * | 4/2001 | Rybicki | .................... | B23K 9/12 219/137.2 |
| 6,610,963 B2 * | 8/2003 | Zamuner | ................... | B23K 9/28 219/136 |
| 6,794,607 B2 * | 9/2004 | Romar | ..................... | B23K 9/32 219/124.02 |
| 6,940,041 B2 * | 9/2005 | Zamuner | ................... | B23K 9/28 219/136 |
| 7,342,199 B2 * | 3/2008 | Zamuner | ................... | B23K 9/28 219/137.31 |

(Continued)

FOREIGN PATENT DOCUMENTS

FR 2962632 A1 * 1/2012 ............... A45B 9/02

*Primary Examiner* — Nicolas J. Weiss
(74) *Attorney, Agent, or Firm* — Cochran Freund & Young LLC; William W. Cochran

(57) ABSTRACT

The present disclosure provides a stabilizer for a welding gun, wherein said stabilizer may comprise a plurality of sections hinged together to allow rotation with respect to each other and in connection with a user's hand. The stabilizer may comprise a holder designed to accept the end of a welding gun and a positioning device at one end to minimize movement of the welding gun. The stabilizer attaches to the user's hand and allows precise and repeatable welding movements. The stabilizer also allows a user to push fingers slightly, instead of constantly gripping the trigger.

20 Claims, 4 Drawing Sheets

(56) References Cited

U.S. PATENT DOCUMENTS

| | | | |
|---|---|---|---|
| 7,446,280 B2* | 11/2008 | Zamuner | B23K 9/28 |
| | | | 219/137.31 |
| 10,010,964 B2* | 7/2018 | Lutgenau | B23K 9/295 |
| 2007/0247571 A1* | 10/2007 | Smith | B23K 5/24 |
| | | | 349/114 |
| 2012/0240301 A1* | 9/2012 | Gustafsson | A41D 13/085 |
| | | | 2/16 |
| 2016/0332264 A1* | 11/2016 | Albrecht | B23K 37/0205 |

* cited by examiner

WELDING GUN STABILIZER

BACKGROUND OF THE INVENTION

Gas metal arc welding (GMAW), sometimes referred to by its subtypes metal inert gas (MIG) welding or metal active gas (MAG) welding, is a welding process in which an electric arc forms between a consumable wire electrode and the workpiece metal(s), which heats the workpiece metal(s), causing them to melt and join.

Along with the wire electrode, a shielding gas feeds through the welding gun, which shields the process from contaminants in the air. The process can be semi-automatic or automatic. A constant voltage, direct current power source is most commonly used with GMAW, but constant current systems, as well as alternating current, can be used. There are four primary methods of metal transfer in GMAW, called globular, short-circuiting, spray, and pulsed-spray, each of which has distinct properties and corresponding advantages and limitations.

Originally developed for welding aluminum and other non-ferrous materials in the 1940s, GMAW was soon applied to steels because it provided faster welding time compared to other welding processes. The cost of inert gas limited its use in steels until several years later, when the use of semi-inert gases such as carbon dioxide became common. Further developments during the 1950s and 1960s gave the process more versatility and as a result, it became a highly used industrial process. Today, GMAW is the most common industrial welding process, preferred for its versatility, speed and the relative ease of adapting the process to robotic automation. Unlike welding processes that do not employ a shielding gas, such as shielded metal arc welding, it is rarely used outdoors or in other areas of air volatility. A related process, flux cored arc welding, often does not use a shielding gas, but instead employs an electrode wire that is hollow and filled with flux.

Welding can be a fatiguing endeavor. Further, with fatigue may come instability in maintaining consistent welds. The fatigue from welding may come in many forms. For instance, overhead welding by experienced and inexperienced welders may result in localized muscle fatigue. Further, there are many kinds of complicated wearable robotic or wearable assistive devices to reduce the burden of workers in several industries.

SUMMARY OF THE INVENTION

Embodiments of the invention may therefore provide a hand attachable welding gun stabilizer apparatus, said apparatus comprising a first section comprising a fitting at a first end, wherein said fitting is enabled to accept at least one finger of a user, a second section hinged to said first section at a location opposite said fitting on said first section, and a third section hinged to said second section at a location opposite said hinging of said first section to said second section, a holder connected to said first section enabled to accept one end of a welding gun and connected to said first section between said fitting and said hinging with said second section, and a positioning stabilizer connected to said third section, wherein said third section has a pair of slots enabled to accept a wrist attachment for securing said third section to a wrist of a user.

Embodiments of the invention may further provide a hand attachable welding gun stabilizer apparatus, said apparatus comprising a first section comprising a fitting at a first end, wherein said fitting is enabled to accept at least one finger of a user, a second section hinged to said first section at a location opposite said fitting on said first section, and a holder connected to said first section enabled to accept one end of a welding gun and connected to said first section between said fitting and said hinging with said second section, and a positioning stabilizer connected to said second section, wherein said second section has a pair of slots enabled to accept a wrist attachment for securing said third section to a wrist of a user.

Embodiments of the invention may further provide a method of stabilizing a welding gun, said method comprising placing a first and second section on top of a user hand, wherein said first and said second section are hinged, placing at least one finger of a user in a fitting attached to said first section, inserting one end of said welding gun into a holder attached to said first section and placing another end of said welding gun into a positioning attachment attached to said second section, and affixing said second section to a wrist of said user with a material enabled to extend through a pair of slots in said second section.

DETAILED DESCRIPTION OF THE INVENTION

Figure 1:
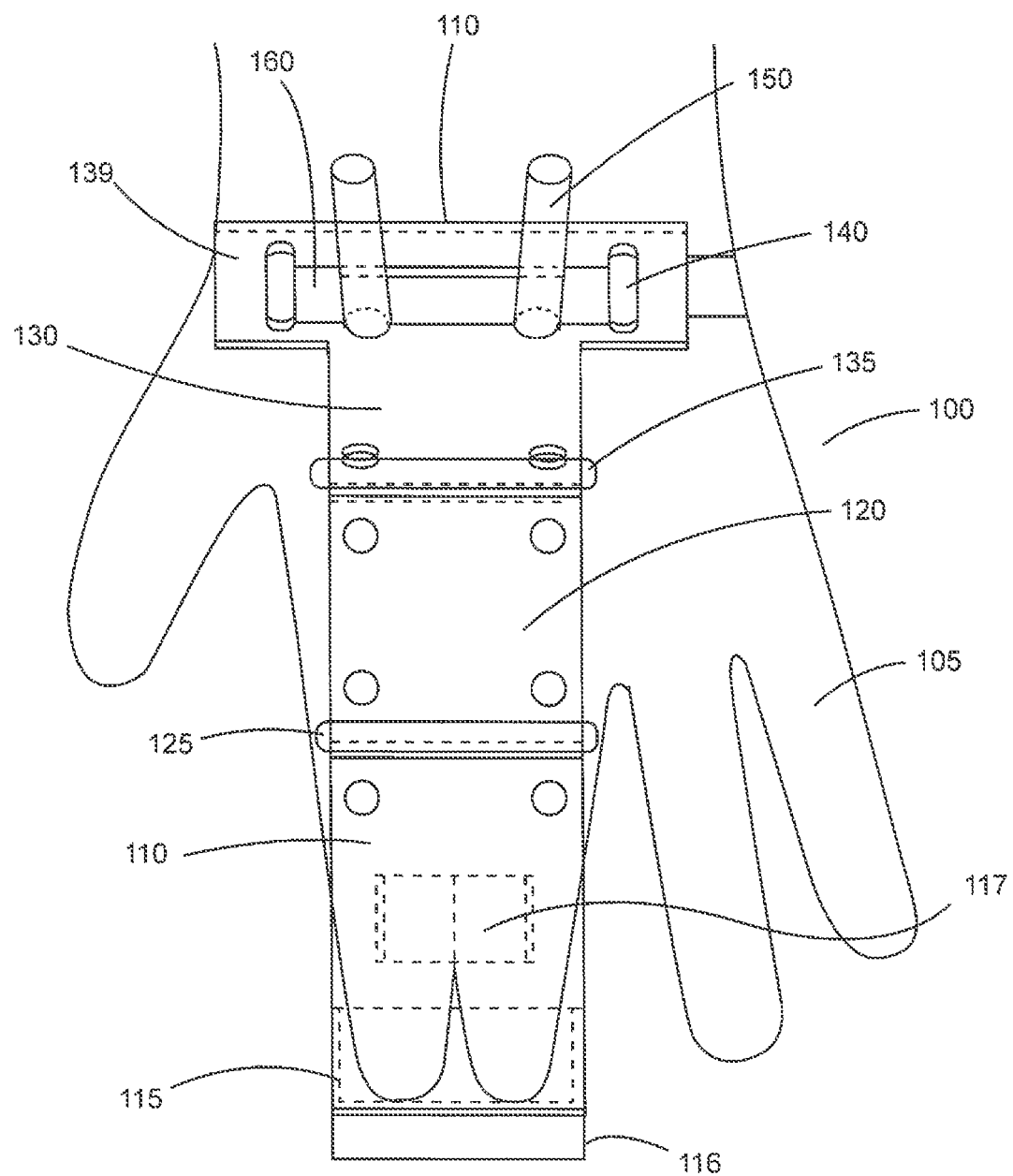
FIG. 1 is a top view of a welding stabilizer.

FIG. 1 shows a top view of a welding stabilizer connected to a hand. The welding stabilizer 100 is connected to the hand 105 of a user. The welding stabilizer 100 comprises a first section 110, a second section 120 and a third section 130. The first section 110 has a fitting 115 into which at least one finger of the hand 105 fits. In FIG. 1, two fingers of the hand 105 are shown in the fitting 115. The fitting 115 may have an end cap 116 which will provide protection for the fingers. The first section 110 is connected to the second section 120 by a first hinge 125. The first hinge 125 may be of any type of hinge that allows the first section 110 to rotate in relation to the second section 120. The second section 120 is connected to the third section 130 by a second hinge 135. The second hinge 135 may be any type of hinge that allows the second section 120 to rotate in relation to the third section 130. Those skilled in the art will understand the types and uses of different hinges that will allow the various sections to rotate in relation to each other.

The first section 110 also is attached to a holder 117. The holder 117 is connected to the first section 110 by any means that allows the holder to remain firmly attached to the first section 110. The holder 117 is designed to allow a welding gun, such as a mig (metal inert gas) welding gun to fit into the holder 117 so that the end of the mig welding gun extends through the holder and is situated to be enabled to be put in welding position by movement of the hand 105 and finger(s). Accordingly, minute movements of the hand 115 and fingers can move the mig welding gun for precise welding. The holder 117 may be adjustable so as to fit firmly over various different mig welding gun tips and types. It is understood that, while the description of the invention may concentrate on mig welding other types of welding guns and welding may be utilized with the invention.

The first hinge 125 is located approximately where the joints of the fingers of the hand 105 are located. This allows the fingers to bend and for the rotation of the first section 110 and the section 120 to be approximately around the flexing of the fingers. Accordingly, the first section 110 is sized to approximate the typical length of the fingers to the second joint of the fingers. It is understood that different sizing of the first section 110 may be desired by different users and different designers. Any size of the first section 110 may be used and still accomplish the objects of the invention.

The second hinge 125 may be located at approximately the location of the joints where the fingers connect to the hand 105. This allows the second section 120 to rotate within in relation to the third section 130 around the joint of the hand with the fingers. Accordingly, the section 120 is sized to approximate the typical length of the fingers from the second joint to the third joint. It is understood that different sizing of the second section 120 may be used and still accomplish the objects of the invention.

Further, although the first hinge 125 is shown separating the first section 110 from the second section 120, the first section 110 and second section 120 may be unhinged and a single piece (not shown). While this may provide slightly less control it will lessen construction costs and time.

The third section 130 is shown having an extended width at one end. This allows the third section to have a pair of slots 140 that accept an attachment material 160. The attachment material 160 may be any material that allows a user to fasten the third section 130 to the wrist of the user. The attachment material may be any fabric that allows fastening, such as a fabric with Velcro or a belt type connection. Those skilled in the art will understand the different types of fasteners that will allow the attachment material 160 to be fastened to a user's wrist.

The third section 130 also has a pair of stabilizers 150. The stabilizers 150 allow for the welding gun (not shown) to be positioned between the stabilizers 150. The stabilizers 150 extend upward from the base portion of the third section 130 to allow positioning of a welding gun there between. The stabilizers 150 allow the welding gun to move with the movements of the hand 105 and not become twisted or out of line with the fingers of the hand.

Figure 2:
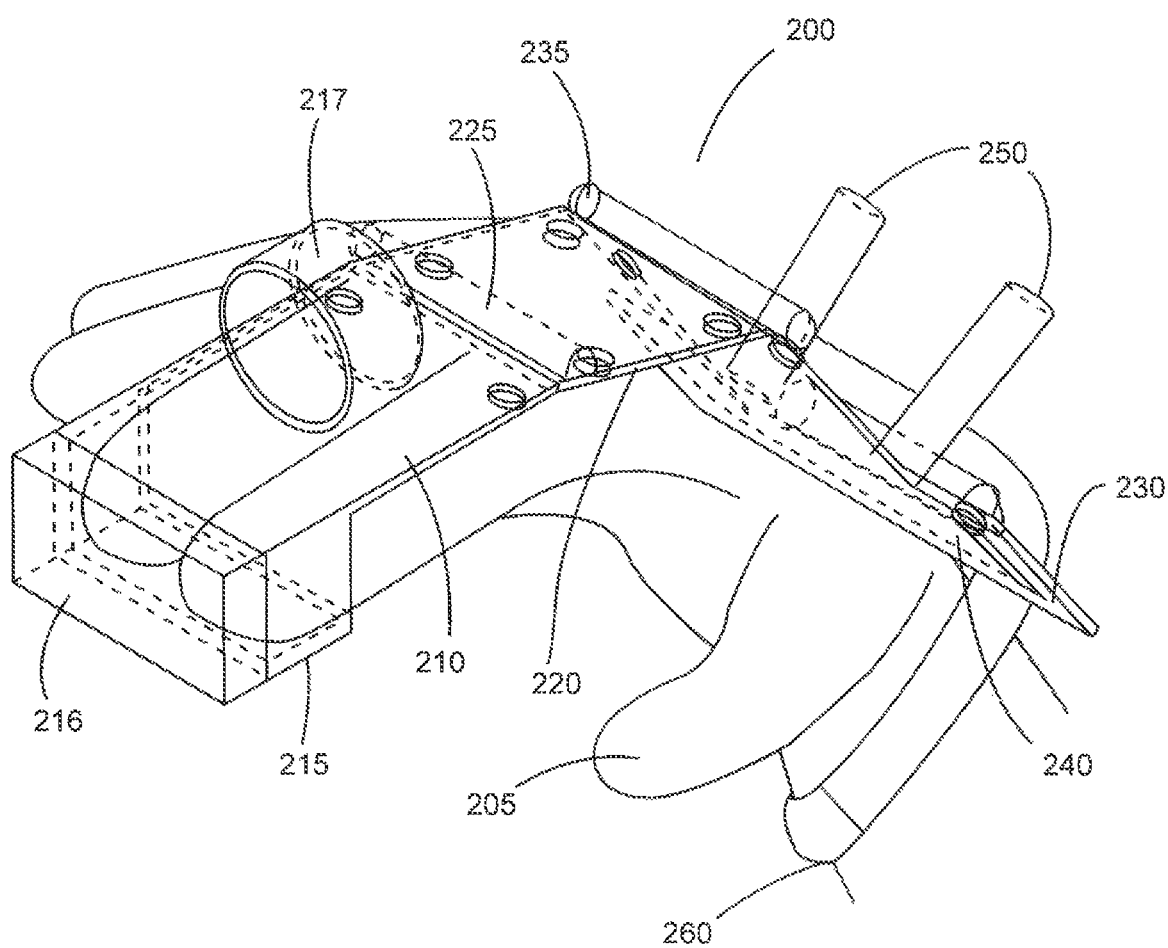
FIG. 2 is a perspective view of a welding stabilizer.

FIG. 2 shows a perspective view of a welding stabilizer connected to a hand. The welding stabilizer 200 comprises a first section 210, a second section 220 and a third section 230. The first section 210 has a fitting 215 into which at least one finger of the hand 205 fits in FIG. 2, two fingers of the hand 205 are shown in the fitting 215. The fitting 215 may have an end cap 216 which will provide protection for the fingers. The first section 210 is connected to the second section 220 by a first hinge 225. The second section 220 is connected to the third section 230 by a second hinge 235.

The first section 210 also is attached to a holder 217. The holder 217 is connected to the first section 210 by any means that allows the holder to remain firmly attached to the first section 210. The holder 217 is designed to allow a welding gun, such as a mig (metal inert gas) welding gun to fit into the holder 217 so that the end of the mig welding gun extends through the holder and is situated to be enabled to be put in welding position by movement of the hand 205 and finger(s). Accordingly, minute movements of the hand 215 and fingers can move the mig welding gun for precise welding. The holder 217 may be adjustable so as to fit firmly over various different mig welding gun tips and types. It is understood that, while the description of the invention may concentrate on mig welding, other types of welding guns and welding may be utilized with the invention.

The first hinge 225 is located approximately where the joints of the fingers of the hand 205 are located. This allows the fingers to bend and for the rotation of the first section 210 and the section 220 to be approximately around the flexing of the fingers. Accordingly, the first section 210 is sized to approximate the typical length of the fingers to the second joint of the fingers. It is understood that different sizing of the first section 210 may be desired by different users and different designers. Any size of the first section 210 may be used and still accomplish the objects of the invention.

The second hinge 225 may be located at approximately the location of the joints where the fingers connect to the hand 205. This allows the second section 220 to rotate within in relation to the third section 230 around the joint of the hand with the fingers. Accordingly, the section 220 is sized to approximate the typical length of the fingers from the second joint to the third joint. It is understood that different sizing of the second section 220 may be used and still accomplish the objects of the invention.

Further, although the first hinge 225 is shown separating the first section 210 from the second section 220, the first section 210 and second section 220 may be unhinged and a single piece (not shown). While this may provide slightly less control it will lessen construction costs and time.

The third section 230 is shown having an extended width at one end. This allows the third section to have a pair of slots 240 that accept an attachment material 260. The attachment material 260 may be any material that allows a user to fasten the third section 230 to the wrist of the user. The attachment material may be any fabric that allows fastening, such as a fabric with Velcro or a belt type connection. Those skilled in the art will understand the different types of fasteners that will allow the attachment material 260 to be fastened to a user's wrist.

The third section 230 also has a pair of stabilizers 250. The stabilizers 250 allow for the welding gun (not shown) to be positioned between the stabilizers 250. The stabilizers 250 extend upward from the base portion of the third section 230 to allow positioning of a welding gun there between. The stabilizers 250 allow the welding gun to move with the movements of the hand 205 and not become twisted or out of line with the fingers of the hand.

Figure 3:
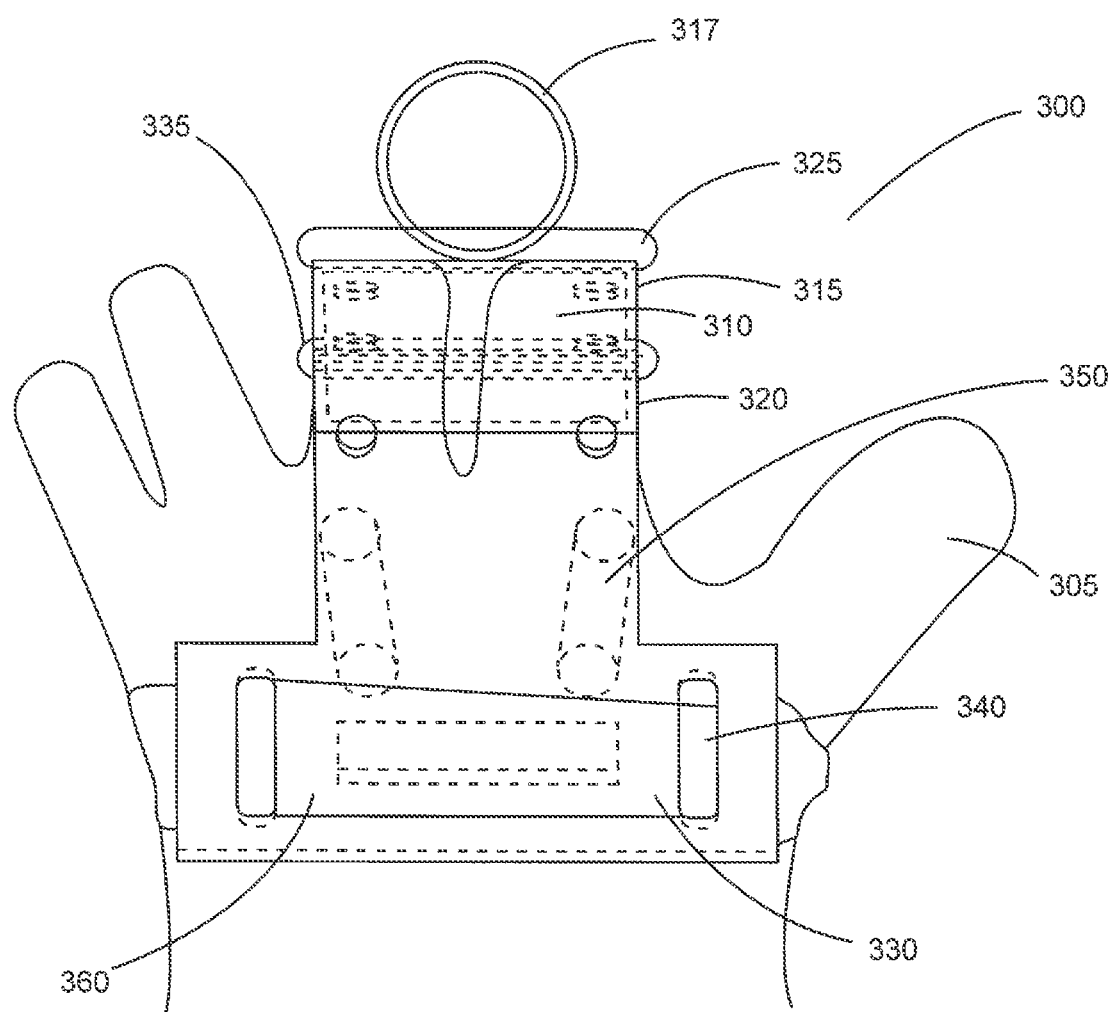
FIG. 3 is a back view of a welding stabilizer.

FIG. 3 is a back view of a welding stabilizer with a hand. The welding stabilizer 300 comprises a first section 310, a second section 320 and a third section 330. The first section 310 has a fitting 315 into which at least one finger of the hand 305 fits. As discussed above, the first section 310 is connected to the second section 320 which is connected to the third section 330. Hinges 325 and 335 provide the connection between the sections as described above.

The first section 310 also is attached to a holder 317. The third section 330 is shown having an extended width at one end. The slots 340 are shown with a connection fabric 360 enabled to go through the slots 340 and around the wrist of a user.

Figure 4:
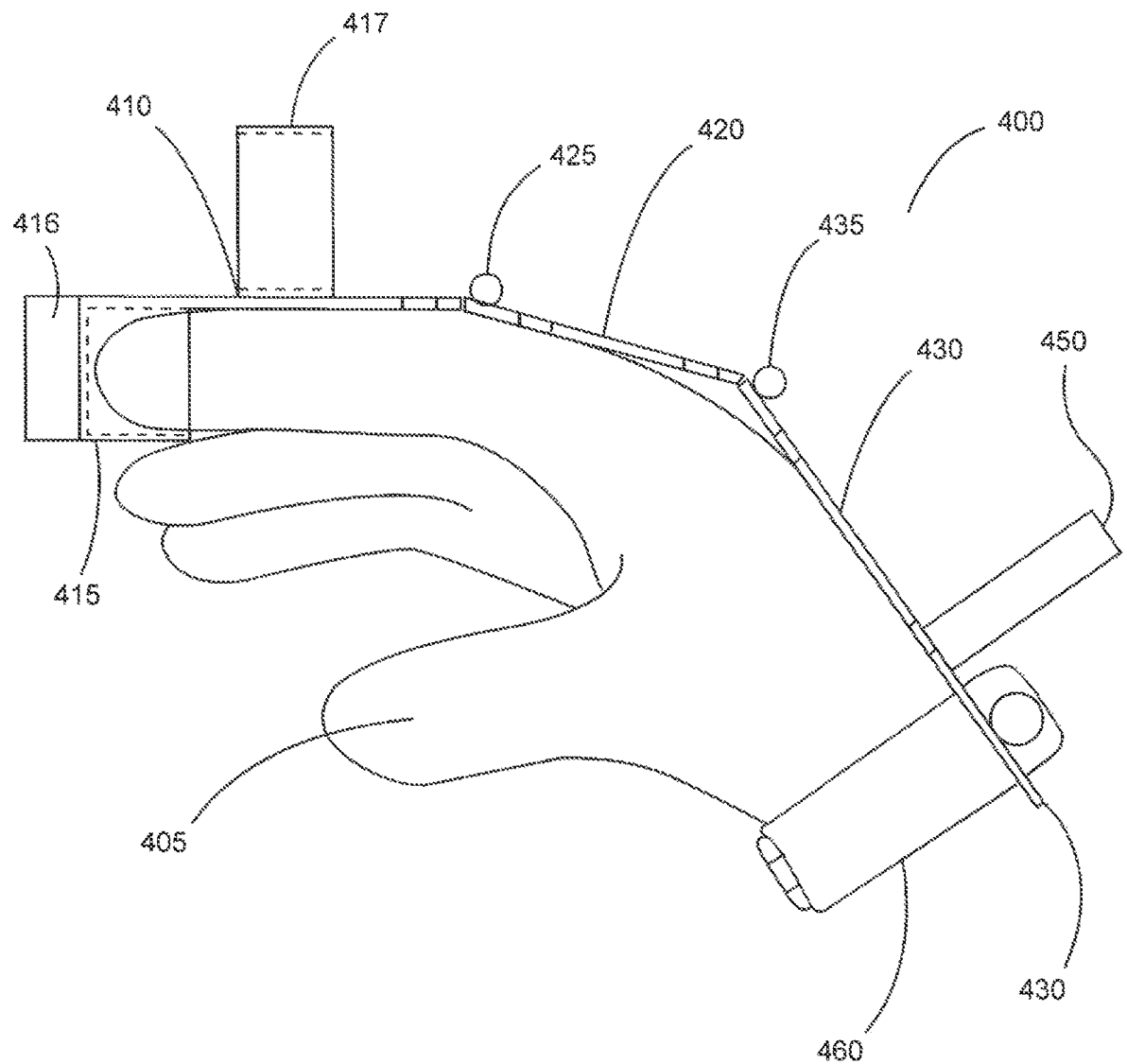
FIG. 4 is a side view of a welding stabilizer.

FIG. 4 is a side view of a welding stabilizer with a hand. The welding stabilizer 400 comprises a first section 410, a second section 420 and a third section 430. The first section 410 has a fitting 415 into which at least one finger of the hand 405 fits. As discussed above, the first section 410 is connected to the second section 420 which is connected to the third section 430. Hinges 425 and 435 provide the connection between the sections as described above.

The first section 410 also is attached to a holder 417. The third section 430 is shown having an extended width at one end. The slots 340 are shown with a connection fabric 460 enabled to go through the slots 440 and around the wrist of a user. Stabilizer 450 connects to the third section 430.

As shown, the third section 430 is comprised of a straight piece of material. The third section may be slightly curved to accommodate the natural curve of a user's wrist. Further, the extended portion (139 in FIG. 1) of the third section 430 may be curved downward to go partially around a user's wrist.

Referring now to FIG. 4, in operation, the stabilizer 400 is placed over a user's hand 405 with the fingers of the user placed into the fitting 415. The attachment material 460 is fastened around the wrist of a user. A mig welding gun (not shown) is placed on top of the stabilizer 400 with the end of the welding gun extending through the holder 417 and beyond the end of the end cap 417 so that the welding gun can contact a desired surface. The welding gun is placed between the stabilizers 450 to minimize sideways movement of the welding gun. The use can manipulate the welding gun through movements of the user's hand and fingers. It is also understood that the hand 405 may be gloved. The glove may be attached to the stabilizer 400 such that a user places a hand inside the glove and attaches the glove to the wrist with the attachment 460.

The stabilizer of the invention may be constructed of any materials suitable for use in a welding environment. Examples of suitable materials may include metals or ceramics. Further, the attachment material may be constructed of any material suitable for a welding environment. Those skilled in the art will understand the materials suitable for a welding environment.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. It will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. In addition, all publications cited herein are indicative of the level of skill in the art and are hereby incorporated by reference in their entirety as if each had been individually incorporated by reference and fully set forth.

What is claimed is:

1. A hand attachable welding gun stabilizer apparatus, said apparatus comprising:
    a first section comprising a fitting at a first end, wherein said fitting is configured to accept at least one finger of a user;
    a second section hinged to said first section at a location opposite said fitting on said first section; and
    a third section hinged to said second section at a location opposite said hinging of said first section to said second section;
    a holder connected to said first section configured to accept one end of a welding gun and connected to said first section between said fitting and said hinging with said second section; and
    a positioning stabilizer connected to said third section;
    wherein said third section has a pair of slots configured to accept a wrist attachment for securing said third section to a wrist of a user.

2. The apparatus of claim 1, wherein said holder is a circular holder.

3. The apparatus of claim 1, wherein said positioning stabilizer comprises a pair of vertical extenders that extend from said third section upward and away from a user.

4. The apparatus of claim 1, wherein said third section is comprised of a first portion and a second portion wherein said second portion is wider than said first portion and said second portion contains said slots.

5. The apparatus of claim 4, wherein said second portion is curved and said first portion is flat.

6. The apparatus of claim 1, said apparatus further comprising a glove attached to a side of said first section, said second section and said third section opposite said holder and said positioning stabilizer.

7. The apparatus of claim 1, wherein said holder is sizing adjustable.

8. A hand attachable welding gun stabilizer apparatus, said apparatus comprising:
    a first section comprising a fitting at a first end, wherein said fitting is configured to accept at least one finger of a user;
    a second section hinged to said first section at a location opposite said fitting on said first section; and
    a holder connected to said first section configured to accept one end of a welding gun and connected to said first section between said fitting and said hinging with said second section; and
    a positioning stabilizer connected to said second section;
    wherein said second section has a pair of slots configured to accept a wrist attachment for securing said third section to a wrist of a user.

9. The apparatus of claim 8, wherein said holder is a circular holder.

10. The apparatus of claim 8, wherein said positioning stabilizer comprises a pair of vertical extenders that extend from said second section upward and away from a user.

11. The apparatus of claim 8, wherein said second section is comprised of a first portion and a second portion wherein said second portion is wider than said first portion and said second portion contains said slots.

12. The apparatus of claim 11, wherein said second portion is curved and said first portion is flat.

13. The apparatus of claim 8, said apparatus further comprising a glove attached to a side of said first section and said second section opposite said holder and said positioning stabilizer.

14. The apparatus of claim 8, wherein said holder is sizing adjustable.

15. A method of stabilizing a welding gun, said method comprising:
    placing a first and second section on top of a user hand, wherein said first and said second section are hinged;
    placing at least one finger of a user in a fitting attached to said first section;
    inserting one end of said welding gun into a holder attached to said first section and placing another end of said welding gun into a positioning stabilizer attached to said second section; and
    affixing said second section to a wrist of said user with a material configured to extend through a pair of slots in said second section.

16. The method of claim 15, wherein said holder is a circular holder.

17. The method of claim 15, wherein said positioning stabilizer comprises a pair of vertical extenders that extend from said second section upward and away from a user.

18. The method of claim 15, wherein said second section is comprised of a first portion and a second portion wherein said second portion is wider than said first portion and said second portion contains said slots.

19. The method of claim 18, wherein said second portion is curved and said first portion is flat.

20. The method of claim 8, wherein said holder is sizing adjustable.

* * * * *